United States Patent [19]
Flaherty

[11] Patent Number: 5,995,253
[45] Date of Patent: Nov. 30, 1999

[54] VARIABLE WAVELENGTH TRANSCEIVER

[75] Inventor: Paul A. Flaherty, Belmont, Calif.

[73] Assignee: Digital Equipment Corporation, Houston, Tex.

[21] Appl. No.: 08/794,790

[22] Filed: Feb. 4, 1997

[51] Int. Cl.[6] .................................................. H04B 10/08
[52] U.S. Cl. ........................ 359/110; 359/172; 359/118
[58] Field of Search ..................... 359/110, 118, 359/143, 152, 172, 164, 157; 370/344

[56] References Cited

U.S. PATENT DOCUMENTS

| | | | |
|---|---|---|---|
| 4,644,587 | 2/1987 | Takahashi et al. | 455/601 |
| 4,723,309 | 2/1988 | Mochizuki et al. | 455/601 |
| 4,809,361 | 2/1989 | Okada et al. | 455/606 |
| 4,875,205 | 10/1989 | Huang | 370/6 |
| 5,107,490 | 4/1992 | Wilson et al. | 370/85.3 |
| 5,218,356 | 6/1993 | Knapp | 359/118 |
| 5,365,509 | 11/1994 | Walsh | 370/13 |
| 5,465,254 | 11/1995 | Wilson et al. | 370/79 |
| 5,588,151 | 12/1996 | Segal et al. | 395/800 |
| 5,598,406 | 1/1997 | Albrecht et al. | 370/296 |
| 5,608,729 | 3/1997 | Orsic | 370/455 |
| 5,706,115 | 1/1998 | Hirayama et al. | 359/172 |
| 5,717,889 | 2/1998 | Rettig | 370/447 |

*Primary Examiner*—Kinfe-Michael Negash
*Attorney, Agent, or Firm*—Cesari and McKenna

[57] ABSTRACT

A variable wavelength transceiver includes a first variable wavelength transmitter, capable of generating an electromagnetic wave of a first wavelength, a second detector of an electromagnetic wave of a second wavelength, and a collision detector coupled to the second detector and the variable wavelength transmitter, the collision detector determining when the energy level of the second detector exceeds a threshold value while the variable wavelength transmitter transmits the electromagnetic wave.

9 Claims, 10 Drawing Sheets

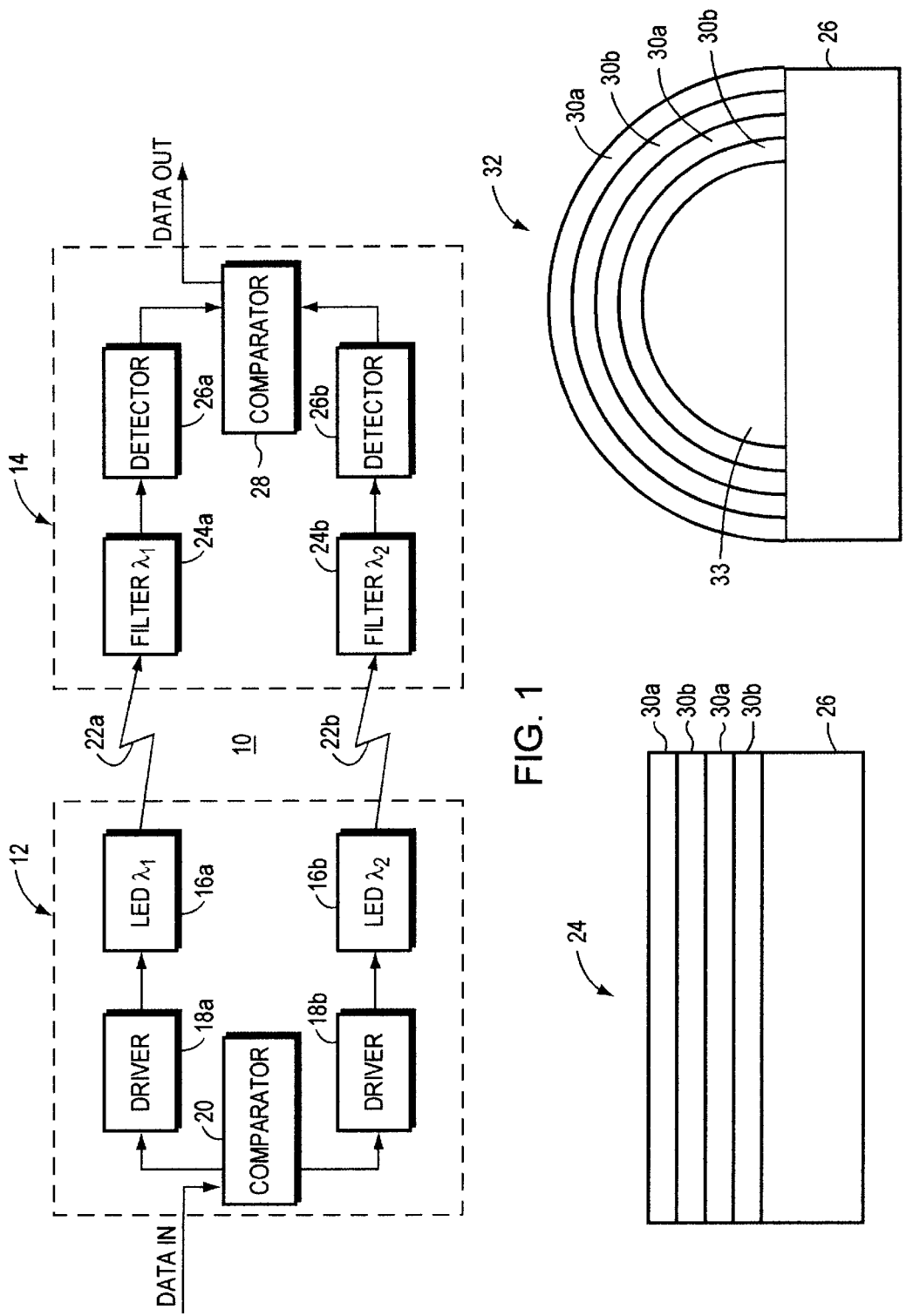

VARIABLE WAVELENGTH TRANSCEIVER

BACKGROUND

This invention relates to optical communication systems.

Local area networks (LANs) connect personal and minicomputers with each other and with other shared resources, for example, printers, file servers, and mainframe computers. Separate LANs can be joined via bridges to form larger linked systems of computers and shared resources.

One of the most popular standards for construction and operation of LANs is the IEEE 802.3 Protocol for Local Area Networks, popularly called the Ethernet standard. The 802.3 standard prescribes a carrier sense multiple access with collision detection (CSMA/CD) protocol for medium access control (MAC), where "medium" refers to a communication medium. The 802.3 CSMA/CD standard allows a number of LAN devices to communicate within a shared communication medium, without central message arbitration. Each LAN device, when sending a message, listens to the communication medium at the same time. If another LAN device also begins sending a message, the first LAN device can sense the multiple access and thereby detect a "collision" between the signals of the two messages. For example, in an Ethernet LAN using coaxial cable as its transmission medium, and employing a digital baseband method of signaling, a collision occurs when the first LAN device starts to send a signal but simultaneously detects a signal coming from a second LAN device within the transmission medium. The first LAN device declares a "collision", and that device (and any other LAN devices also attempting to send messages) implements a standard back-off protocol. The back-off protocol typically requires the LAN device to wait increasingly longer random periods of time after each collision before attempting to resend its message.

The 802.3 CSMA/CD standard has also been implemented in non-metallic transmission systems, such as optical fiber and spread-spectrum radiofrequency communications networks. The 802.3 CSMA/CD standard may be applied to any broadcast medium, so long as the medium can support a method for collision detection. For coaxial cable media (as above), one collision detection method measures the energy density at the transceiver, since signal levels of all transceivers measured anywhere along the transmission line are similar.

Infrared communication techniques are attractive because they offer a number of benefits, including low transceiver costs, low power consumption, high device reliability, high biosafety, low installation costs, and little required cabling. Existing infrared transmission standards (for example, IRDA94) provide for data transmission point-to-point, single access protocols. These are typically half-duplex, utilize amplitude modulation (AM), and do not provide any form of collision detection. Instead, these standards typically rely on collision avoidance. A true multiaccess infrared LAN requires a method of collision detection for high utilization of available IR bandwidth. Furthermore, a useful method of IR collision detection would allow implementing the full 802.3 CSMA/CD protocol, permitting an IR multiaccess LAN to integrate seamlessly with other conventional LAN systems and devices.

SUMMARY

In general, one aspect features apparatus for communication including a first variable wavelength transmitter, capable of generating an electromagnetic wave of a first wavelength, a second detector of an electromagnetic wave of a second wavelength, and a collision detector coupled to the second detector and the variable wavelength transmitter, the collision detector determining when the energy level of the second detector exceeds a threshold value while the variable wavelength transmitter transmits the electromagnetic wave.

Embodiments may include the following features. The first variable transmitter can generate electromagnetic waves of a plurality of discrete wavelengths. The second detector can detect electromagnetic waves of a plurality of discrete wavelengths. The apparatus can include a second variable wavelength transmitter, capable of generating an electromagnetic wave of the second wavelength, and a first detector of an electromagnetic wave of the first wavelength, where the collision detector is coupled to the first detector, and where the collision detector determines whether the energy level of the first detector exceeds a threshold during a transmission of an electromagnetic wave of the second wavelength by the second variable transmitter.

The apparatus can include a first detector of an electromagnetic wave of the first wavelength, where the collision detector is coupled to the first detector, and where the collision detector determines whether the energy level of the first detector exceeds a threshold during a transmission of an electromagnetic wave of the second wavelength by the first variable transmitter.

The first variable transmitter can include a first light emitting diode portion, and a second light emitting diode portion, the first and second light emitting diode portions arranged to form an optical cavity between them. The optical cavity can be a Fabry-Perot interferometer. The second light emitting diode portion can have an imbedded electrode that can vary the conduction across the second light emitting diode portion. The second detector can include an optical detector, and a thin-film variable interferometer layer coupled to the optical detector. The thin-film variable interferometer layer can further include first and second dielectric thin-film layers each having respective conductive contacts to apply charge to each respective thin-film layer to vary its dielectric constant. The first and second wavelengths can be in the infrared portion of the electromagnetic spectrum.

Advantages may include one or more of the following. A variable wavelength transceiver can quickly and easily implement wavelength division multiplexing, allowing an IR LAN to adaptively add more signal carriers as needed. If certain wavelengths have more ambient noise than others, all communications can be simply transferred over to less-noisy wavelengths. The multiple wavelengths used in the preferred collision detection scheme can be generated by one variable frequency laser diode.

Other features and advantages of the invention will become apparent from the following description and from the claims.

DRAWINGS

FIG. 1 is a schematic block diagram of a dual-wavelength transmitter and receiver.

FIGS. 2a and 2b are cross-sections of multilayer thin film filters.

DESCRIPTION

Figure 3:
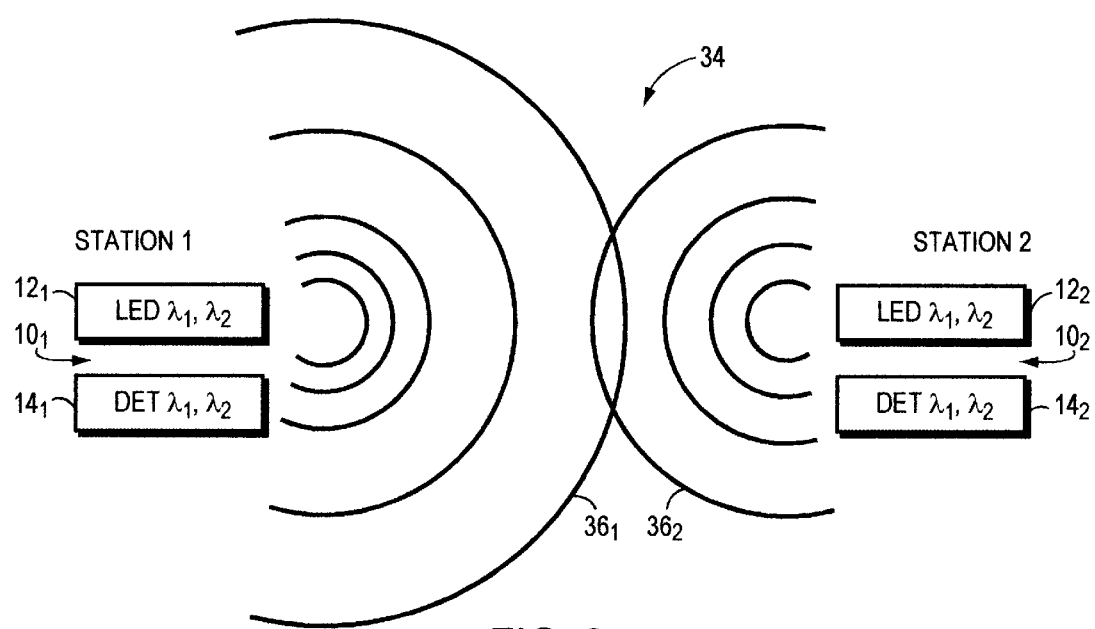
FIG. 3 is a schematic diagram of two LAN devices in an IR network environment.

Referring to FIG. 1, a dual-wavelength infrared link 10 includes a dual-wavelength transmitter 12 and a dual-wavelength receiver 14. An infrared tansceiver includes a transmitter and a receiver. The dual-wavelength transmitter includes two transmitters 16a and 16b emitting IR signals at two specified wavelengths $\lambda_1$ and $\lambda_2$, e.g., light emitting diode (LED) lasers centered on 850 nm and 950 nm (nanometers) respectively. As an example, one LED can be a typical GaAs incoherent LED operating in the 950 nm region, and the other LED can be a GaAs LED doped with an aluminum impurity to shift its emission band to 850 nm. (In the IR electromagnetic domain, wavelength expressed in nanometers is normally the measurement unit used, but wavelength and frequency are complementary terms for noting the particular electromagnetic wave being used for transmission of signals).

Infrared link 10 receives signals to be sent from an attachment unit interface (AUI) (not shown). Typically, each LAN device has an AUI that governs transceiving LAN messages using the appropriate LAN protocols. Driver comparator 20 senses drive level transitions from the AUI and selects which of the drivers 18a or 18b should signal next. LEDs 16a and 16b are then driven by respective matched drivers 18a and 18b.

For example, if differential Manchester encoding is used, turning on the first wavelength $\lambda_1$ might represent a high level, and the second wavelength $\lambda_2$ might represent a low level, so that a transmitter transition from one level to another at the beginning of a bit period signals a logical "zero", and no transition at the beginning of the bit period signals a logical "one". Any scheme of encoding can be used with transmitter 12, including a simple scheme where a logical "one" is represented by pulses of the first wavelength $\lambda_1$ and a logical "zero" is represented by pulses of the second wavelength $\lambda_2$.

Signals 22a and 22b from the two transmitters 16a and 16b enter the IR transmission medium (e.g., a room) and are detected by the dual-wavelength receiver 14. The dual-wavelength receiver 14 includes two bandpass thin film IR filters 24a and 24b tuned to the first and second wavelengths $\lambda_1$ and $\lambda_2$ (wavelengths can also refer to wavelength bands). Detectors 26a and 26b are coupled to respective IR filters 24a and 24b to detect impinging signals of the corresponding respective wavelengths. Each detector may be, for example, a photo-diode, avalanche diode, or a PIN photo-diode. Signals from detectors 26a and 26b are compared by a tri-state detector comparator 28, which provides three possible outputs: high, low, or collision. A collision occurs when both detectors register IR signals above a predetermined threshold, typically set above the background noise of the environment, but below the lowest signal strength received at transceiver 10. The lowest signal strength is typically received from the LAN device farthest from the receiver (because IR signals attenuate with the inverse square of distance).

Filters 24a and 24b can be constructed as conventional multilayer thin film bandpass filters (e.g., a succession of quarter-wave layers of two substances 30a and 30b having different optical indices), as shown in FIG. 2a, with a detector 26 placed directly underneath. While such a flat filter works effectively for signals that are normal to the surface of the filter, the bandpass function degrades significantly for signals arriving at other angles. One variation, shown in FIG. 2b, includes a hemispherical set of layers 32 deposited onto a hemispherical lens 33 set over detector 26. The resulting hemispherical bandpass filter 32 allows IR light to impinge from a wide variety of angles without impairing the bandpass function. If some directionality is desired for a particular detector configuration (for example, if the IR radiation is only to come from a particular direction), the hemispherical shape of the filter can be altered to add or subtract desired directionality along any selected axis.

Referring to FIG. 3, two LAN transceivers $10_1$ and $10_2$ interact in a common transmission medium 34, for example, the space within a room. The respective dual-wavelength transmitters $12_1$ and $12_2$ are concurrently transmitting, and the resulting signals $36_1$ and $36_2$ will strike respective dual-wavelength receivers $14_1$ and $14_2$ substantially concurrently.

Figure 4:
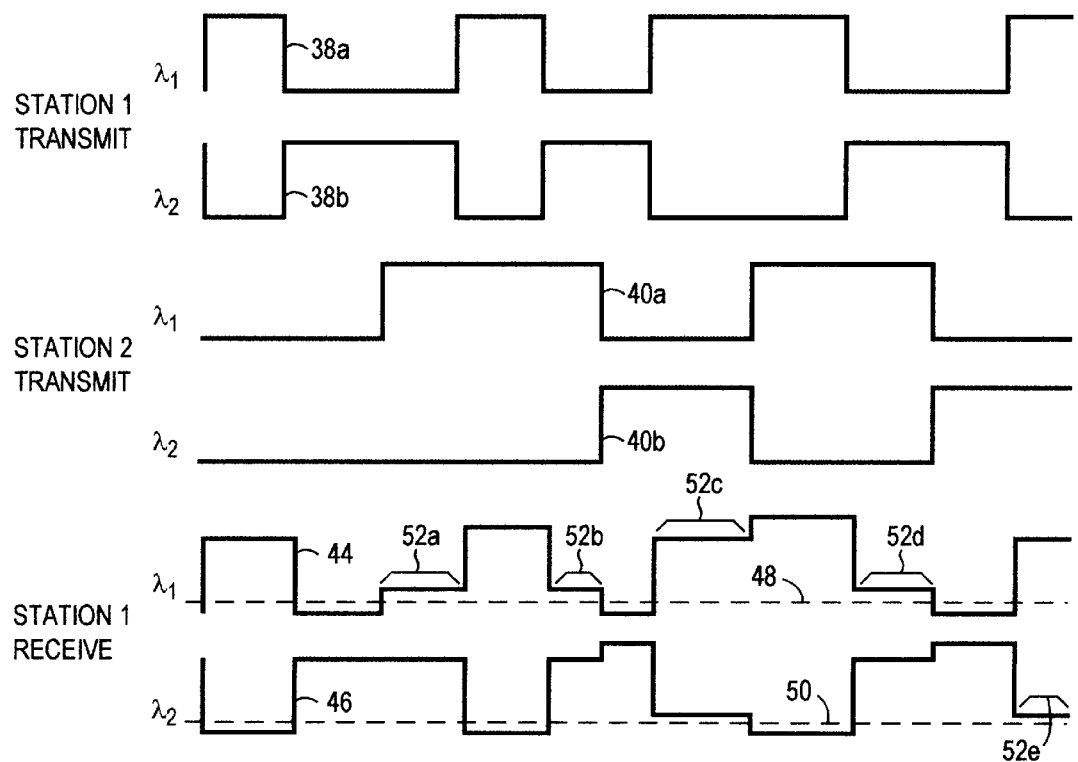
FIG. 4 is a signal timing diagram of transmission and detection of IR signals and collisions.

The timing diagram of FIG. 4 illustrate the operation of one embodiment of the invention when two LAN transceivers (stations 1 and 2) transmit two separate, different messages at approximately the same time. Station 1 sends a first signal 38a on wavelength band $\lambda_1$ and a second, inverse signal 38b on wavelength band $\lambda_2$. A short time after station 1 begins, station 2 starts sending a first signal 40a on wavelength band $\lambda_1$ and a second, inverse signal 40b on wavelength band $\lambda_2$. As shown, when not sending data (at the beginning of signals 40a and 40b) a LAN transceiver sends no signals, which is why signal 40b is not exactly the inverse of signal 40a at its beginning. The receiver of station 1 receives resultant combined signals 44 and 46 in the two wavelengths. Since station 2 is some distance from station 1, its signal strength drops as the inverse square of the distance. So a signal pulse from Station 2 at a wavelength may add only a little to the surrounding background at station 1.

Collisions can be declared when the station 1 receiver detects signals at an amplitude higher than some threshold value 48 or 50 for the corresponding wavelength, at a time when Station 1 is not sending a signal at that wavelength. For example, received signals 44 and 46 (at $\lambda_1$ and $\lambda_2$) shows multiple collisions. Collision 52a is where received signal 44 is higher than threshold value 48, but $\lambda_1$ signal was not sent (signal 38a). Similarly, collision 52c occurs when received signal 46 is higher than threshold value 50, but no $\lambda_2$ signal was sent (signal 38b). By comparing the energy level of the signal at the receiver 14 against a threshold value and against the known signal sent by the local transmitter 12 for each wavelength band $\lambda_1$ and $\lambda_2$, collisions can correctly be detected and declared.

Each LAN device includes a dual-wavelength transceiver 10 having both IR transmitter 12 and receiver 14. Since each LAN transceiver transmits an IR signal in only one of its wavelength bands $\lambda_1$ and $\lambda_2$ at a time, the LAN transceiver can detect collisions if it detects a signal at the second wavelength band $\lambda_2$ when it is transmitting at the first wavelength band $\lambda_1$, and vice versa. This collision detection method can be termed generally "wavelength shift keying". Since broadcast IR radiation attenuates rapidly with distance, wavelength shift keying allows the LAN device to detect a collision when receiving a very low signal strength signal of another device at one wavelength band when its own high signal strength signals are broadcast at the other wavelength. Also, even though multiple ambient reflections tend to "smear" out individual signal pulses, a local transceiver can still detect a colliding signal on one wavelength while sending (and then detecting) such a smeared-out signal on the second wavelength. Further, by using two wavelengths instead of one, the probability of detecting collisions during any given cycle doubles to increase collision detection efficiency.

Figure 5:
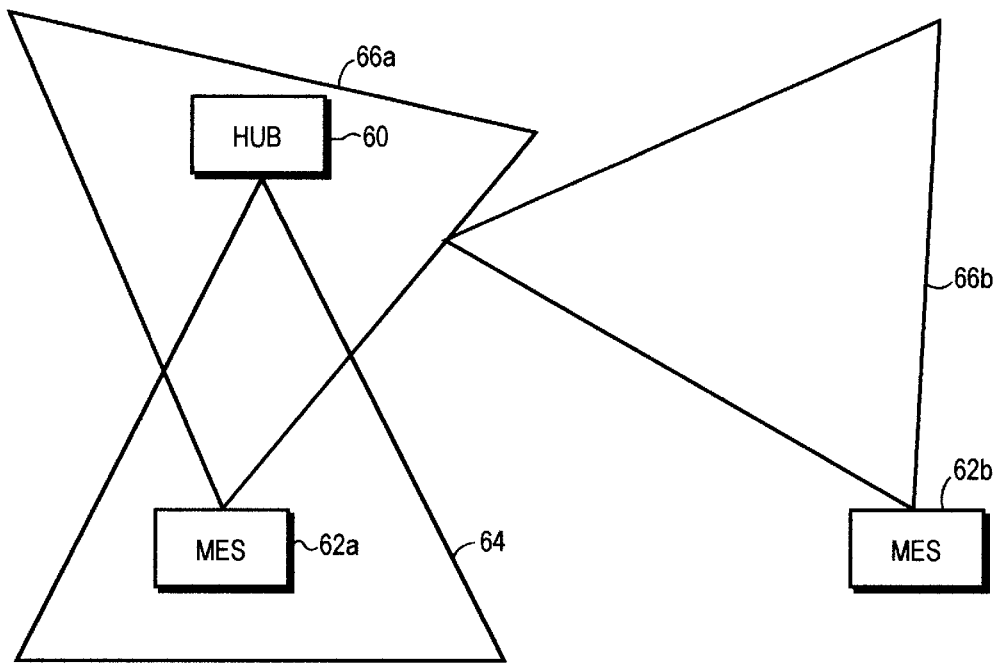
FIG. 5 is a coverage diagram of an IR network environment.

Referring to FIG. 5, a typical office infrared LAN includes a network hub 60, and one or more mobile end stations (MES's) 62a and 62b (e.g., desktop or laptop computers). Due to multipath reflections and dispersions, the range of a high speed infrared transmitter is limited to a relatively small radius (for example, 5 meters). As shown, the transmission field 64 of hub 60 can reach MES 62a but not 62b. Similarly, transmission field 66a of MES 62a can reach hub 60 (allowing return messages), but transmission field 66b of MES 62b cannot.

Figure 6:
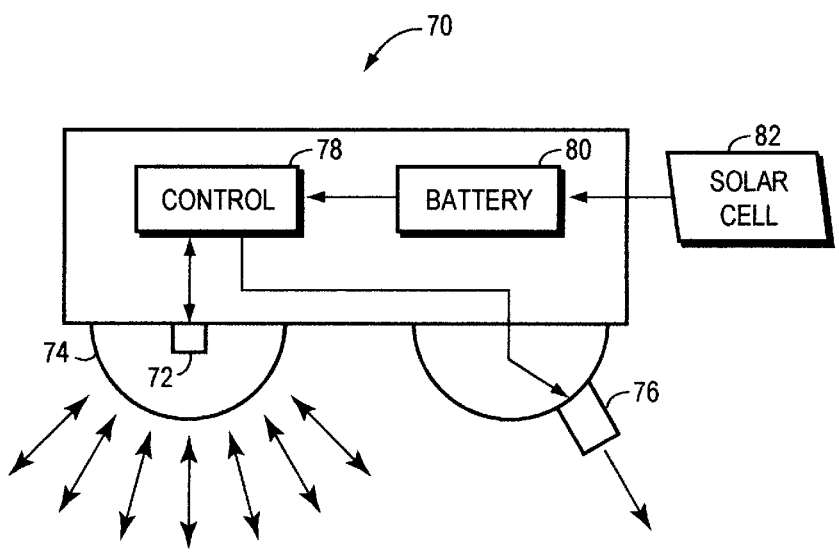
FIG. 6 is a schematic diagram of a IR repeater.

Referring to FIG. 6, a two-port IR repeater 70 includes a transceiver 72 coupled to a hemispherical turret lens 74 (for receiving and transmitting IR information from a number of directions), and directional link turret 76 that can move in a half-hemispherical direction. Control block 78 controls the passage of signals to and from transceiver 72 and link turret 76. Battery 80 powers repeater 70, and is replenished through power from photovoltaic cell 82 (which can be powered by the energy provided by ambient office light, for example).

Figure 7:
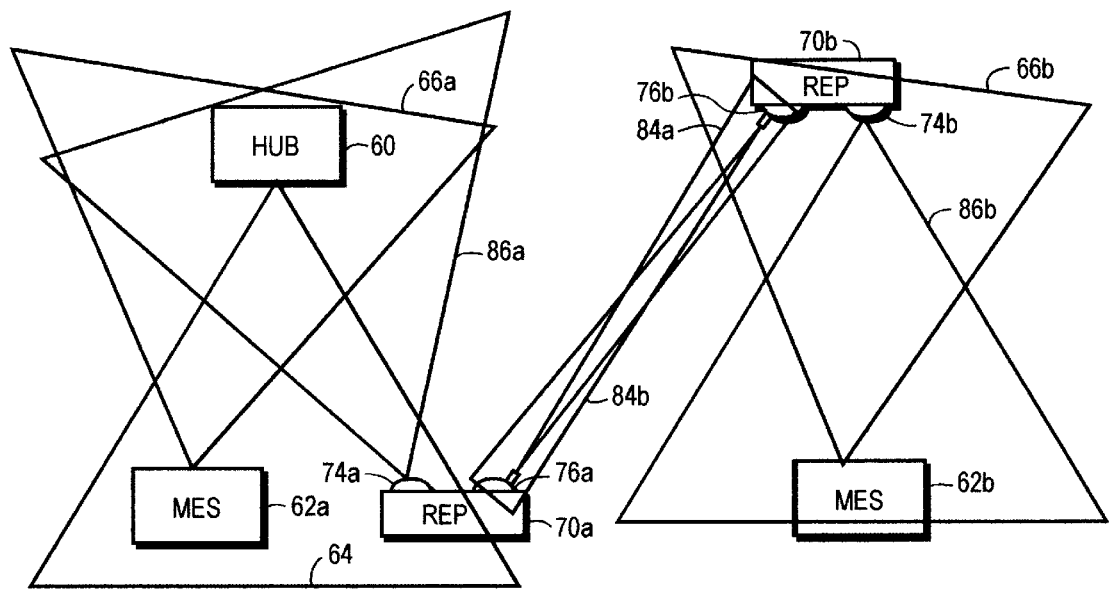
FIGS. 7 and 8 are coverage diagrams of an IR network environment with IR repeaters.

Referring to FIG. 7, both near and far MESs 62a and 62b communicate with LAN hub 60, through use of repeaters (REPs) 70a and 70b. Repeater 70a is placed within the transmission field 64 of hub 60. Its hemispherical turret lens 74a receives information from hub 60, transmits it to its respective directional turret 76a, which then transmits a focused transmission 84a to the directional turret 76b of repeater 70b. By focussing the link transmissions 84a and 84b, the IR range can be extended, for example up to 50 meters between repeaters. Repeater 70b, in turn, transmits the repeated signal through its hemispherical turret lens 74b. Since MES 62b is within the transmission field 86b of repeater 70b, the repeated signal reaches MES 62b.

Figure 8:
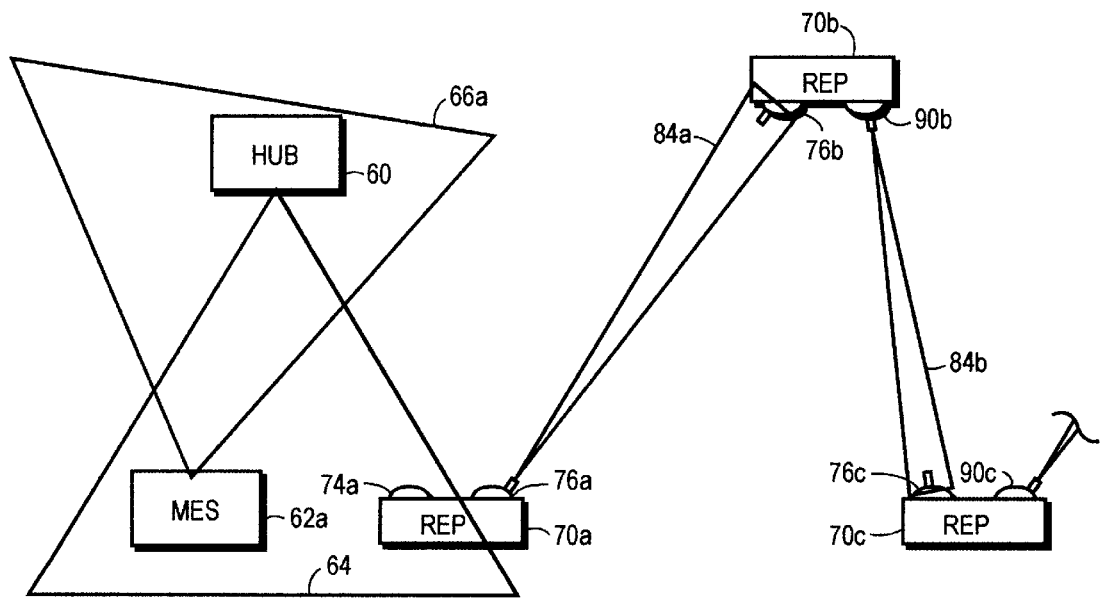

Information sent back by MES 62b (through transmission field 66b) is received by hemispherical turret lens 74b of repeater 70b, transmitted through directional turret 76b to directional turret 76a of repeater 70a, and then back to hub 60, through hemispherical turret lens 74a (having transmission field 86a). Thus, distant MES 62b can maintain communication with hub 60 through self-contained, self-powered repeaters 70a and 70b Referring to FIG. 8, multiple repeaters 70a, 70b, and 70c, etc. can be linked in a chain to carry signals from a hub 60 to a distant location (not shown). Repeater 70a receives a signal from transmission field 64 of hub 60, transmits it via focussed transmission field 84a of its directional turret 76a to directional turret 76b of repeater 70b. Repeater 70b, instead of a hemispherical turret lens has a second directional turret 90b that transmits the signal via transmission field 84b to repeater 70c, which also has two directional turrets 76c and 90c. Repeater 70c can send the signal to further repeaters down the chain. In some applications, each turret can be assigned a different wavelength, to avoid interference and to prevent feedback loops from forming out of transient reflections. By employing cheap, ambient-light-powered repeaters, IR LAN networks can be easily installed to allow transmission of signals around walls, through doorways, and throughout complicated architectural spaces.

Figure 9:
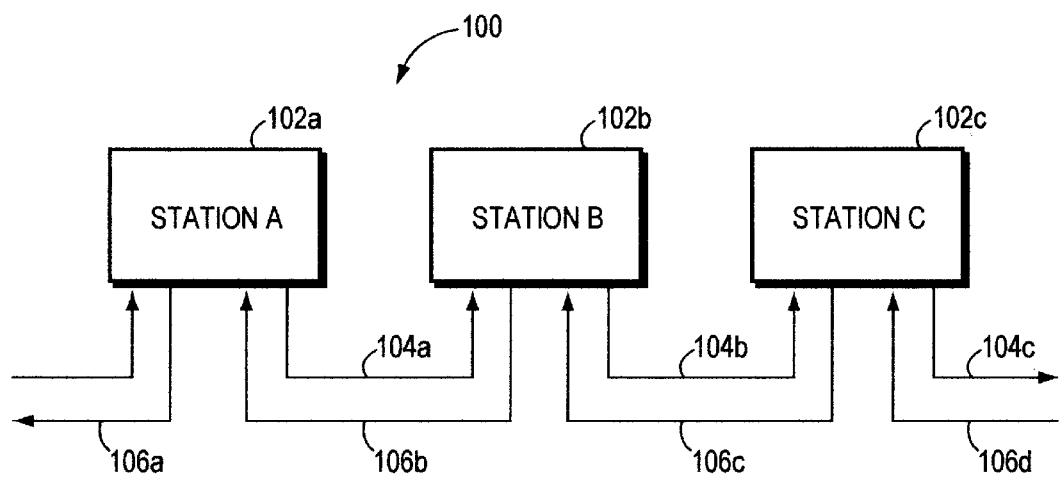
FIG. 9 is a schematic diagram of a fiberoptic network.

Infrared communications networks can also be formed using optical fiber links. Optical fiber networks typically have the topology 100 shown in FIG. 9. Each station 102 is serially linked to immediately adjacent stations by a forward circuit 104 and a backward circuit 106. When station 102a sends a message to station 102c, the message passes through station 102b. A failure at station 102b can make the network fail. The Fiber Distributed Data Interconnect (FDDI) standard takes this into account and provides each station with bypass circuitry for rerouting messages along the network circuit, even when the intermediate station has lost power, or is otherwise disabled. Such bypasses can be costly and may not be reliable under all circumstances.

In another topology (not shown), all stations (or nodes) connect through a central switch. If the central switch fails, all messaging within the network ceases. In each case, the links are half-duplex, where communications pass in only one direction.

Figure 10:
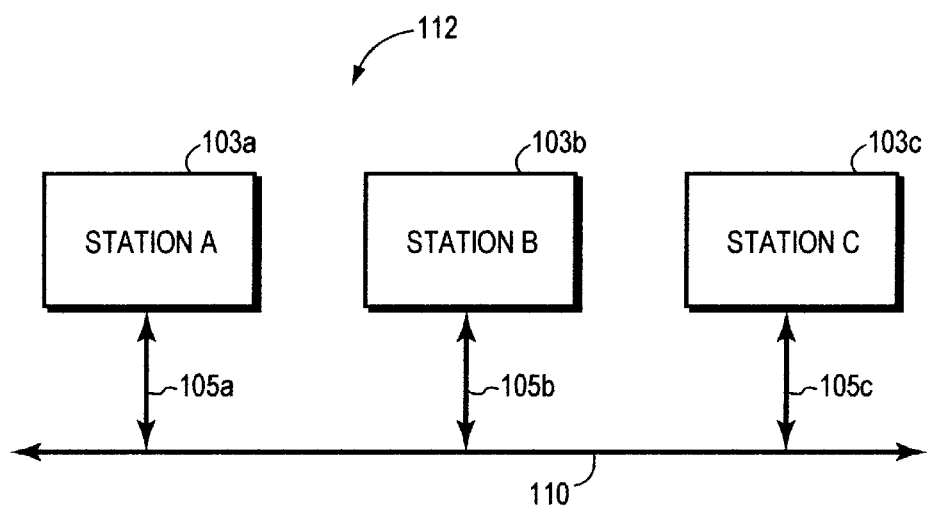
FIG. 10 is a schematic diagram of a multiple access fiberoptic network.

Referring to FIG. 10, a bidirectional CSMA/CD optical fiber network 112 includes a number of network stations 103, each coupled to a bi-directional guided optical transport fiber 110 by bi-directional transceiver 105.

Figure 11:
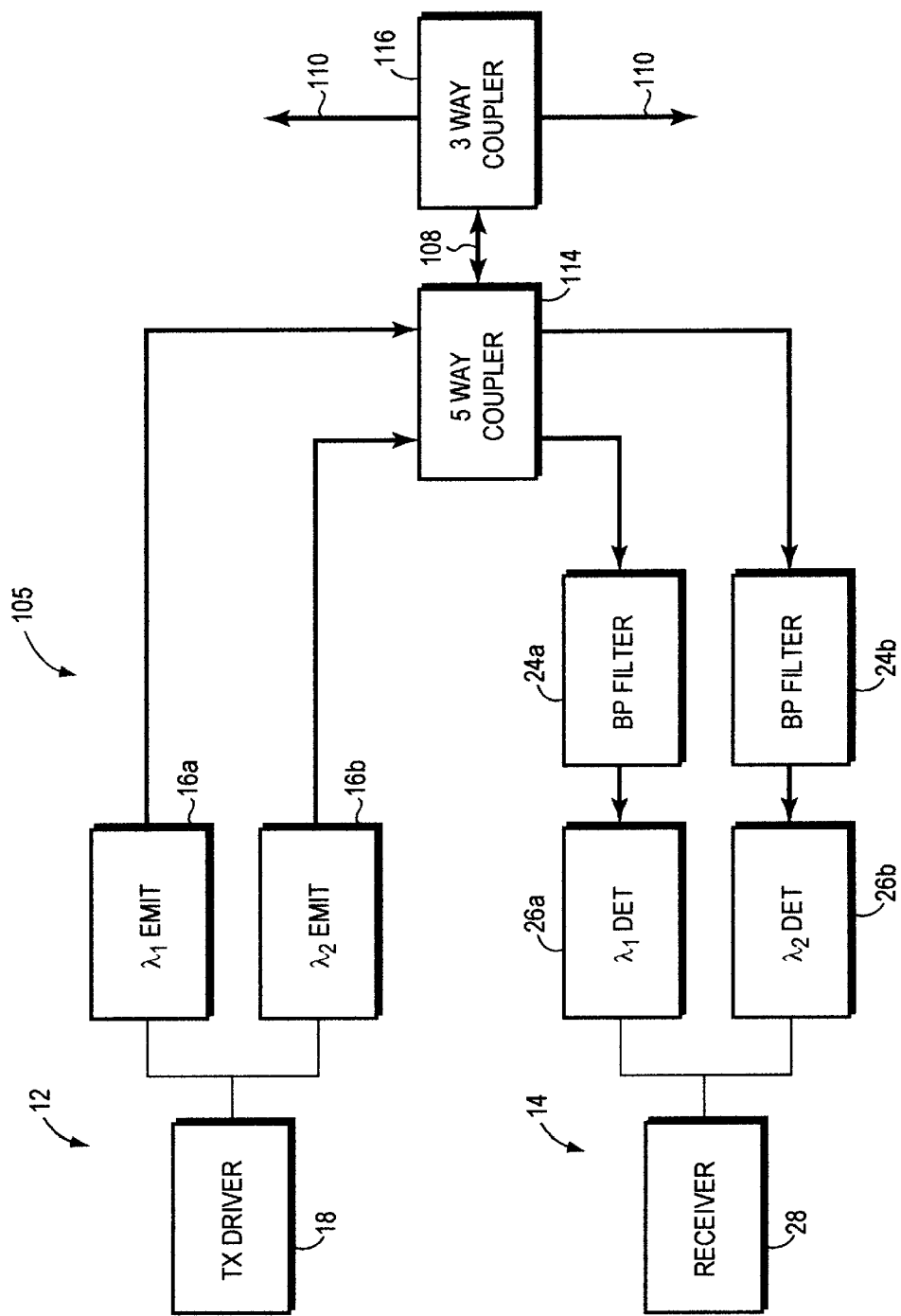
FIG. 11 is a schematic diagram of a dual-wavelength transceiver for a multiple access fiberoptic network.

Referring to FIG. 11, each station 103 couples to transport fiber 110 via dual-wavelength fiber transceiver 105. Dual wavelength fiber transceiver 105 includes a dual wavelength transmitter 12 (including driver 18 and two laser diode transmitters 16a and 16b), and a dual wavelength receiver 14 (including detectors 26a and 26b with respective bandpass filters 24 and 24b and receiver/comparator 28). Dual wavelength fiber transceiver 105 operates substantially the same as the unguided infrared link 10 described above.

The radiant energy from transmitters 16a and 16b, and the radiant energy to detectors 26a and 26b, are coupled through a 5-way fiber coupler 114 to bidirectional link 108. In turn, bidirectional link 108 couples (through a 3-way coupler 116) to transport fiber 110, which is the "backbone" of the optical fiber network. To function properly, all optical fiber connections in the network (both within each station, and coupling each station to transport fiber 110) must be properly matched to prevent erroneous collision detections due to reflected signals. Both ends of transport fiber 110 require termination, either within a final station (not shown) or within an evanescent fiber terminator (not shown).

The fiberoptic network (which can be termed a "guided" network) illustrated by FIGS. 10 and 11 can be employed at a variety of wavelengths including infrared, visible, and ultraviolet light. Furthermore, if multiple pairs of wavelengths were employed, wavelength division multiplexing (WDM) would allow many CSMA/CD networks to be placed within the same single transport fiber 110. Switching and/or routing among such co-located WDM networks could be accomplished by any station, allowing great architectural flexibility for network designers.

Figure 12:
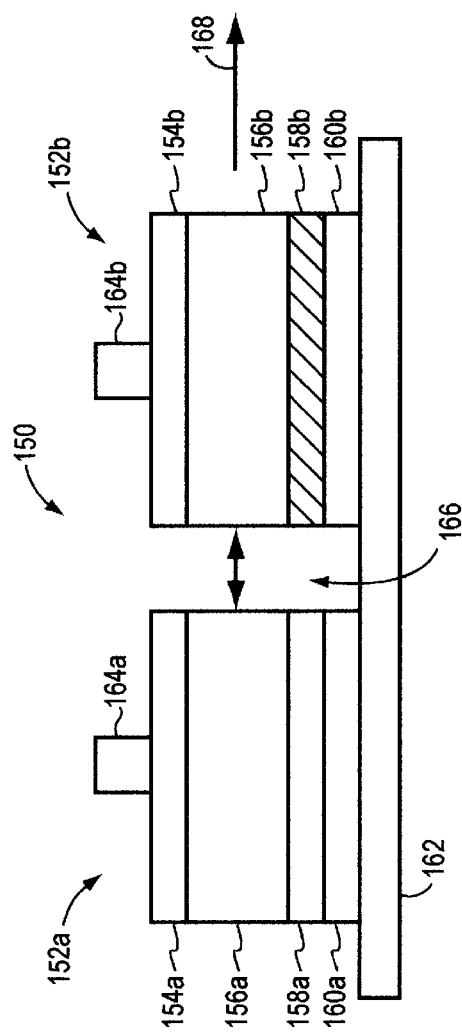
FIG. 12 is a schematic diagram of a variable wavelength laser diode transmitter.

It may be desirable in some circumstances to replace the fixed dual-wavelength transmitters 12 and detectors 14 of FIGS. 1 and 11 with variable wavelength counterparts: wavelengths could then be changed as needed, even during message transmission. Referring to FIG. 12, a semiconductor variable wavelength laser 150 is formed as a cleaved coupled cavity laser. Each diode portion 152a and 152b of variable wavelength laser 150 includes a gold film upper surface 154a and 154b, a heterojunction 156a and 156b, an insulating layer 158a and 158b, and a bonding layer 160a and 160b for attaching each portion 152a and 152b to a substrate 162. In an analogue to, for example, Butterworth or Chebyshiev-type filters, each layer in the diode acts as a ¼λ transmission line filter, providing a proper boundary impedance match at its design wavelength. Impedance mismatch (and hence filtering) increases exponentially with larger (or smaller) wavelengths from the design wavelength.

Insulating layer 158b, of the right diode portion 152b, has an imbedded stripe electrode for varying the conduction in diode portion 152b. Upper contacts 164a and 164b drive diode portions 152a and 152b to conduct, or not.

During laser operation, left diode portion 152a is driven into conduction, while right diode portion 152b is varied from no conduction to full conduction. The cleave 166 between left and right diode portions 152a and 152b forms a variable wavelength Fabry-Perot interferometer. The coupling between this interferometer and the left diode portion 152a (conducting as a laser diode) allows the selection of the wavelength of the laser. Laser light 168 of a selected frequency radiates from the right diode portion 152b.

Figure 13:
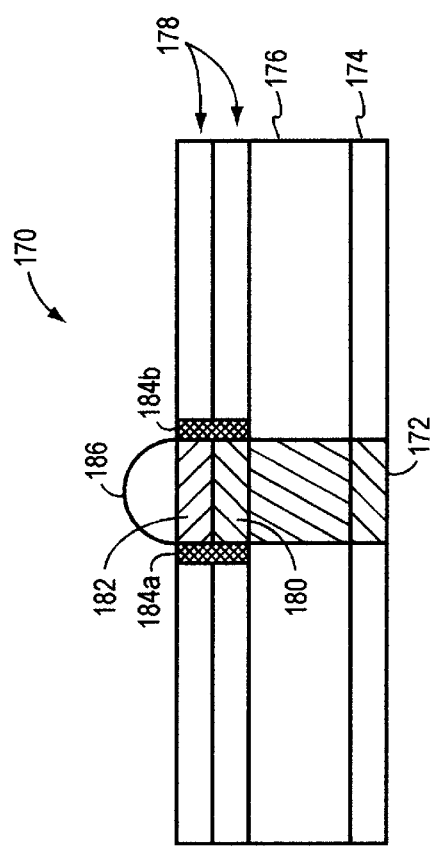
FIG. 13 is a schematic diagram of a variable wavelength filter receiver.

Referring to FIG. 13, a variable wavelength receiver 170 has an optical detector 172 imbedded within an insulating layer 174. An optical matching layer 176 couples detector 172 to a thin-film variable interferometer layer 178. Variable interferometer 178 includes a plurality of dielectric thin-film layers 180 and 182 (two are shown, but more can be used to increase precision of wavelength selection) having metal contacts 184a and 184b. Charge placed on contacts 184a and 184b can, by capacitive effects, alter the dielectric constants of thin-film layers 180 and 182, altering their optical properties, and forming a variable optical filter. Hemispherical matching lens 186 gathers light for guiding into variable interferometer 178 (and then to detector 172). If used in an optical fiber environment, the hemispherical matching lens can be replaced with an appropriate fiber optical matching section for coupling variable wavelength receiver 170 to the fiber system.

Variable wavelength transmitter 150 and variable wavelength receiver 170 can replace transmitters 16 and detectors 24/26 in FIGS. 1 and 11, to form a variable wavelength optical transmission system. Such a system could implement CSMA/CD, and further use a number of different wavelengths, or frequency channels. Each variable detector/transmitter could assist in implementing flexible wavelength division multiplexing by switching as needed to other pairs of wavelength bands. Multiple separate CSMA/CD networks could thereby be employed over the same communications medium. One network could operate at wavelengths $\lambda_1$ and $\lambda_2$, while another network could operate at wavelengths $\lambda_3$ and $\lambda_4$. These wavelengths choices could be altered dynamically as needed. Further, only one variable wavelength transmitter 150 and receiver 170 would be needed per LAN station, since both could rapidly switch to different operational wavelengths.

Figure 14:
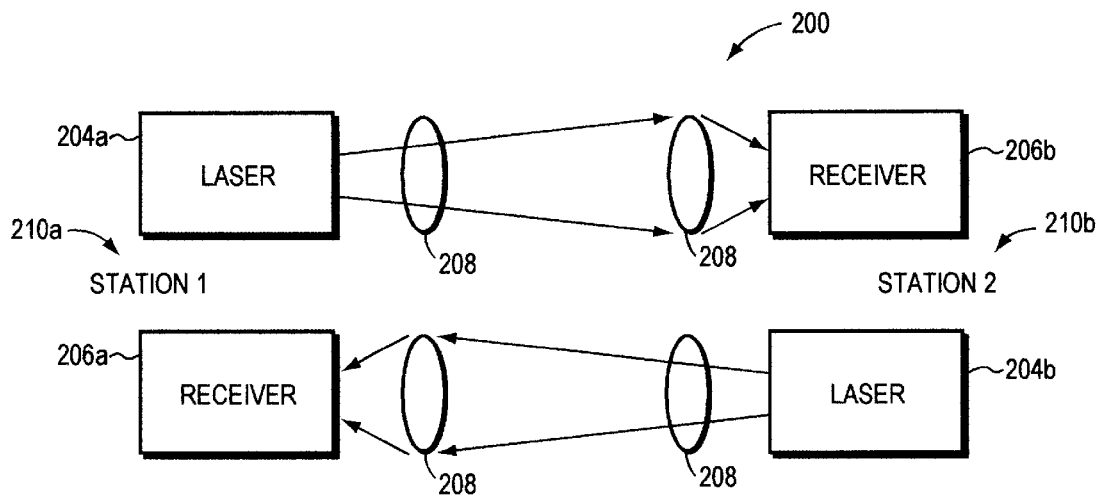
FIG. 14 is a schematic diagram of a prior art laserbased communication system.

Referring to FIG. 14, a prior art directed but unguided optical communications system 200 typically includes a laser 204a and a receiver 204b, with the directed communication link borne by laser light passing typically through lenses 208. Such directed, but unguided communication links have a number of applications, for example: instances where wire and/or fiberoptic cabling would be prohibitively expensive or difficult to install; temporary installations, such as for trade shows or customer demonstrations; portable communications links for military and emergency applications; and backup links to improve facility reliability. As with RF wireless communication links, unguided directed optical links are subject to high ambient noise in the environment. Unguided directed optical systems typically reduce noise interference through optical amplification by lenses and tubing, to reduce the effect of noise sources (for example, a bird flying through the enlarged beam), but increasing the need for mechanical stability and pointing accuracy. As in FIG. 14, if the link is bidirectional (as is usually the case), then two sets of optics are required, where a first station 210a and second station 210b each has a set of laser and receiver 204a and 206a, 206b and 204b respectively, along with lenses 208. With separated directed links (from laser 204a to receiver 206b, and from laser 204b to receiver 206a), collision detection may not be necessary.

Figure 15:
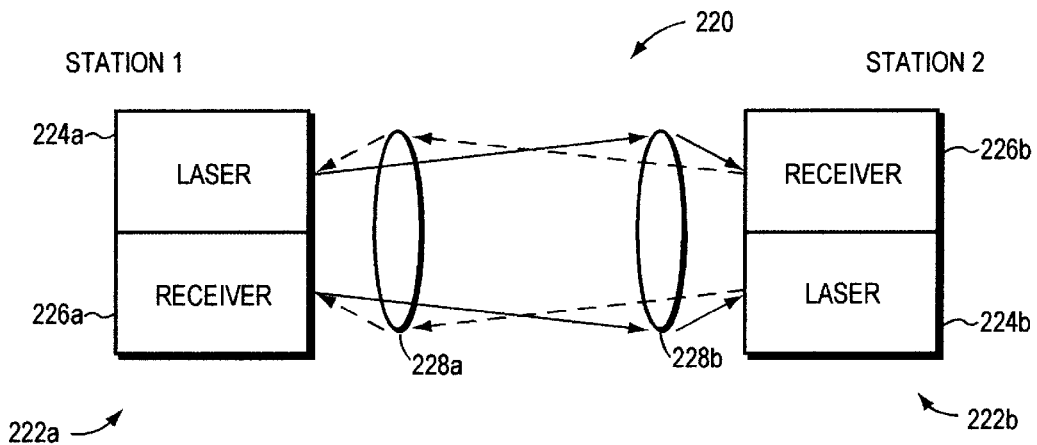
FIG. 15 is a schematic diagram of a bidirectional directed laser communication system with collision detection.

Referring to FIG. 15, a combined unguided directed communications system 220 has two compact communications stations 222a and 222b formed from matched sets of (respectively) laser 224a and receiver 226a, and laser 224b and receiver 226b. Only a single set of optics 228a and 228b is required at each end, reducing manufacturing costs, increasing mechanical stability and reliability, and easing look-angle requirements. In the combined system, the wavelength shift keying methods described above suffice to provide collision detection, if any is required. That is, lasers 224a and 224b each has paired laser sources at two different wavelengths, or a variable wavelength transmitter as described above and shown in FIG. 12.

Figure 16:
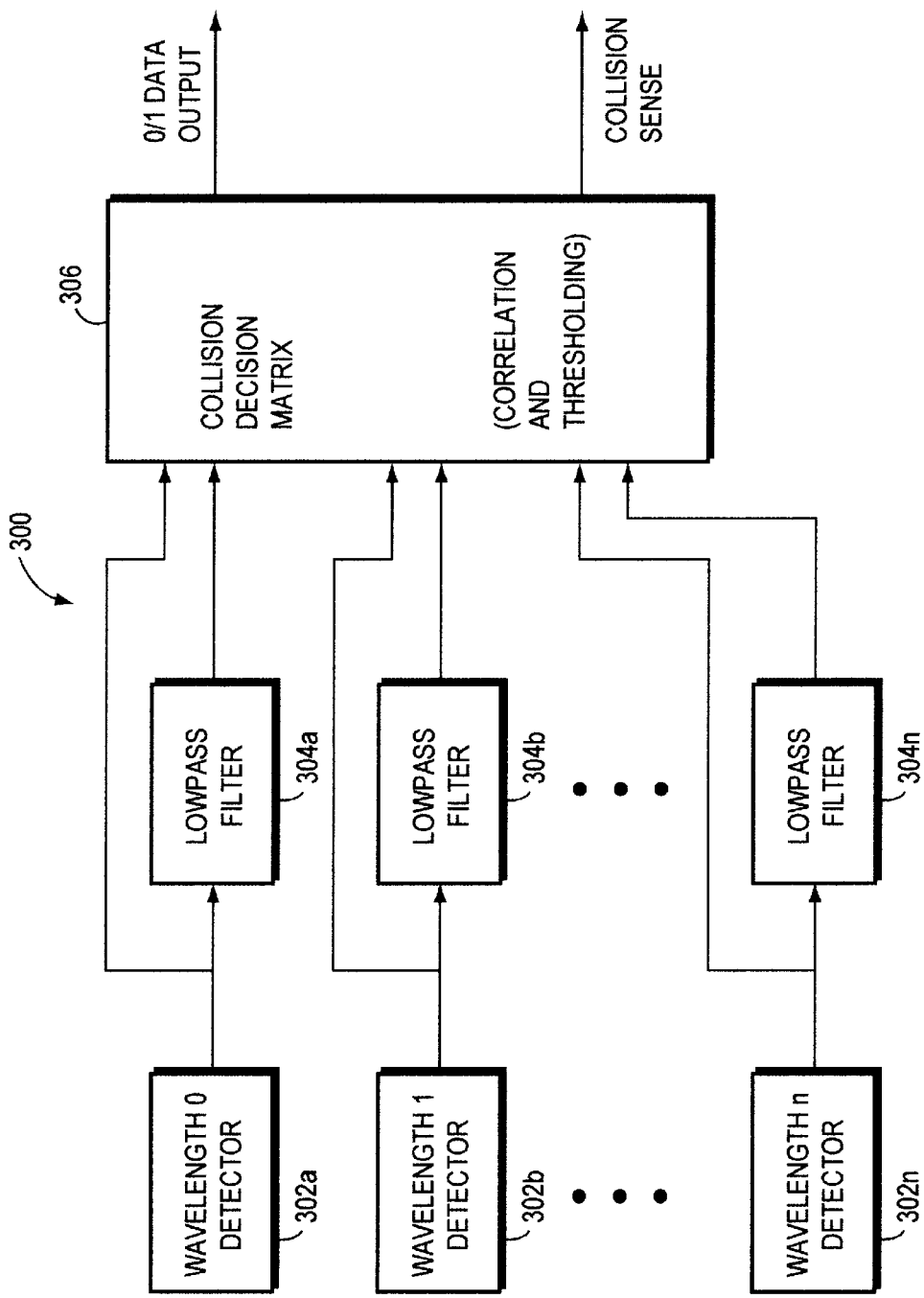
FIG. 16 is a schematic diagram of a multiple wavelength detection system with collision detection.

Since only one wavelength is in use in the unguided directed communications system 220 at any one time, an improved receiver can be devised which attenuates wideband noise such as is typically found in outdoors environments. Referring to FIG. 16, an improved multiple wavelength receiver 300 has a number of specified wavelength detectors 302a through 302n. Signals from each detector 302 can be filtered by lowpass filters 304a through 304n. Signals can also pass directly to a collision detection matrix block 306. Lowpass filters 304 measure and average long-term ambient signals, e.g. noise, therefore the decision and collision thresholds of collision-detection matrix block 306 can be adjusted accordingly. Thus, the receiver adjusts to a wide variety of ambient noise conditions as the environment of the transmission medium changes.

Figure 17:
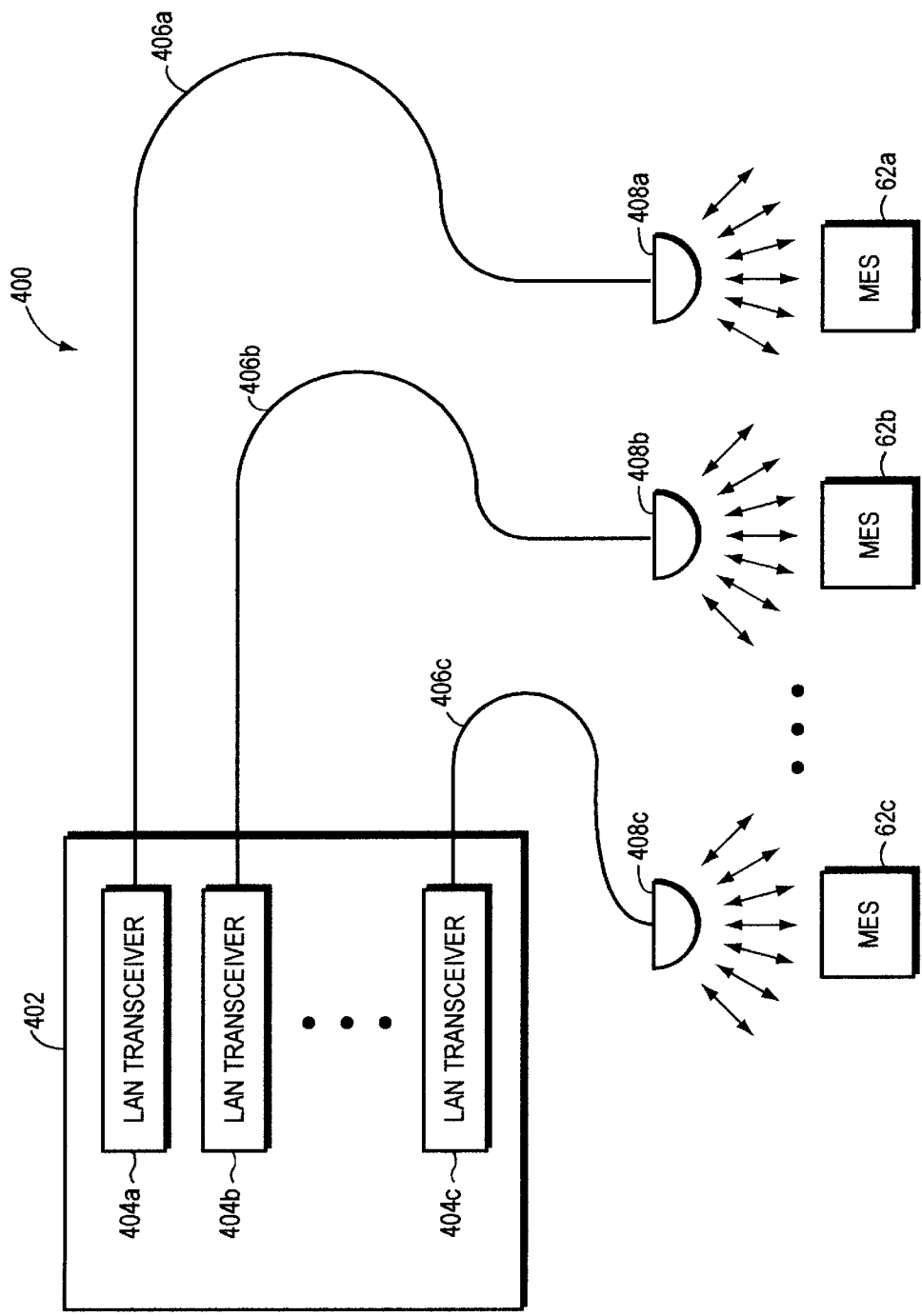
FIG. 17 is a schematic diagram of an IR LAN.

Referring to FIG. 17, a fiberoptic LAN system 400 includes a centralized LAN transceiver station 402 which can be located in an equipment closet or similar location in an office building or the like, and which is coupled to one or more LAN servers (not shown) to provide full LAN networking capabilities. LAN transceiver station 402 includes one or more separate LAN transceivers 404a–404c, each of which can include the components shown in FIG. 11, including a set of transmitters 16a and 16b and a set of detectors 26a and 26b. Each LAN transceiver 404a–404c is coupled to a respective fiberoptic cable 406a–406c. Each fiberoptic cable 406 terminates in a respective hemispherical lens 408a–408c that is properly optically matched to the end of the cable. Each fiberoptic cable 406 can be used to provide IR fiberoptic connection to a particular region, such as an enclosed office, or a segment of a hallway. Individual hemispherical lenses 408a–408c can thereby communicate with individual respective MESs 62a–62c, located in different portions of an office (or other IR LAN environment).

Fiberoptic LAN system 400 provides a relatively easy and flexible approach for LAN cabling an arbitrarily organized environment, where the LAN system provides for two-way communication with portable LAN stations. Since no electrical cabling is required from LAN transceiver station 402 to hemispherical lenses 408, LAN system 400 allows straightforward, low maintenance cable placement.

Further, LAN transceivers 404 can be fabricated on a single wafer substrate, allowing for large numbers of IR fiberoptic cables to terminate in a single, compact LAN transceiver station 402. Such a large scale integration approach also can decrease the costs of implementing a sizable IR LAN.

The methods and apparatus described above can find profitable application in a number of settings. Networks formed of computers, printers, personal digital assistants (PDAs), and modems can be formed by wireless IR communications links. Such networks can provide ideal temporary connections, such as between buildings having wire-based LANs and laptops or PDAs, or for office equipment mobility in rapidly changing business environments. Individuals can use this wireless capability for mobile home-based computing. In addition, wavelength shift keying, combined with wavelength division multiplexing, can greatly increase transmission capacity of optical fiber.

The technologies can be employed to adapt home appliances or office equipment into a richly connected wireless network. Using bidirectional communication, appliances equipped as computer-operated devices can learn of each other's existence and cooperatively communicate. For example, a stereo system which is wirelessly linked to a telephone can go silent when a nearby telephone begins to ring. A "smart" remote control can learn of the existence of all controllable appliances in the home, and adapt itself to operate each of them, without user intervention. A separate window air conditioner can query a thermostat located somewhere else in the home, and modify its output accordingly. A home security system, upon detection of an intruder, can turn on all appliances to attract attention.

The methods and apparatus described herein can also be adapted to "Smart Cards" and other authentication devices, for ease of use. Bidirectional identification cards can be used to allow a client to approach a secured door, conduct an authentication transaction during the approach, and unlock the door, without requiring the usual step of pausing before the door and placing the card over a reader, for example. Similarly, quick transactions using an electronic payment or digital cash transfer are possible, for example, with motorists passing a properly equipped tollbooth, or with a customer and a properly equipped cash register.

In buildings equipped with suitably sized IR LAN networks as described above, guests carrying a smart badge, able to communicate with the network, can be quickly and interactively routed to their destination. The system can locate them as they pass from cell to cell and transmit suitable audio directions to route them correctly. Also, the location of the visitor can be monitored for security purposes, and the visitor can be given exit routes during emergencies. Similarly, museum guests can be provided interactive guided tours where information is downloaded to a smart badge based upon the location of the guest vis-a-vis particular exhibits or works of art.

In hospitals, patients can be equipped with a transceiver coupled to biosensors so that medical information is continually sent to a central tracking system, even as the patient leaves their room. High available bandwidth, and suitably sized cells, allows for a large number of biodata channels, and for location tracking, should such a patient develop a sudden condition away from their room. Medical teams can be then immediately and reliably dispatched to assist. Patients can also carry their medical charts "with them" electronically: any physician or nurse equipped with a medical PDA can approach a patient and quickly download their chart, allowing quick response to a patient who is away from their room.

A warehouse equipped with an IR LAN with collision detection can use inexpensive transceivers to track crates and packages. Package transit and content information can be contained locally with each such package in a flash memory, along with handling precautions and hazardous material emergency instructions. When a so-equipped package arrives, information can be downloaded as the package is physically moved from the loading dock, and through the plant. Again with suitable LAN cell sizing, the location of the package can be continuously tracked. Also, electronic sensors can be implanted in the package, to monitor temperature, humidity, shocks, etc. If such parameters exceed approved limits, the package can broadcast a request for assistance, e.g., to the warehouse environment system.

Due to the bidirectionality and the typical high bandwidth IR signals of the described methods and apparatus, high fidelity digital audio and video signals can be transferred among remote, portable transceivers. Information rich data (stock quotes, news, weather reports, and other informative broadcasts) can be made available on inexpensive alphanumeric pagers, audio pagers, or portable television receivers. Software updates can be downloaded on routine, periodic bases, not only to personal computers, but also to household appliance microcontrollers.

Other useful products enabled by the technology include robust wireless keyboards able to control multiple computers (for those having more than one computer on a desk), or multiple keyboards attached to a single computer (e.g., for training purposes). Every clock and appliance can have small transceivers built-in to periodically receive time-of-day and synchronization information from their environment LAN, allowing all clocks in a home or office to be synchronized accurately. For example, VCRs would be precisely synchronized to program recording start and end times.

Other embodiments are within the scope of the claims. For example, other wavelengths or frequencies of electromagnetic radiation can be employed for message communication, including visible light, ultraviolet light, and radio frequency EM radiation. Any number of different detectors and transmitters can be employed, and a variety of filtering mechanisms used to provide at least two different wavelength or frequency choices for collision detection. Collision detection can occur by either sensing received radiation from both the local and remote transmitters, or by noting received and thresholded radiation in one channel when the local transmitter knows it is sending radiation in the other channel.

What is claimed is:

1. Apparatus for communication comprising:
   a first transmitter capable of generating an electromagnetic wave of a first wavelength;
   a second transmitter capable of generating electromagnetic wave of a second wavelength;
   a first detector for detecting electromagnetic waves of said first wavelength;

a second detector for detecting electromagnetic waves of said second wavelength; and a collision detector coupled to the first detector and the second detector, the collision detector indicating a collision occurrence when the energy levels of both the first detector and the second detector exceed a threshold value.

2. The apparatus of claim 1 wherein the first transmitter generates electromagnetic waves of a plurality of discrete wavelengths.

3. The apparatus of claim 1 wherein the second detector detects electromagnetic waves of a plurality of discrete wavelengths.

4. The apparatus of claim 1 where the first transmitter comprises:

a first light emitting diode portion; and a second light emitting diode portion, the first and second light emitting diode portions arranged to form an optical cavity between them.

5. The apparatus of claim 4 wherein the optical cavity is a Fabry-Perot interferometer.

6. The apparatus of claim 4 wherein the second light emitting diode portion has an imbedded electrode that can vary the conduction across the second light emitting diode portion.

7. The apparatus of claim 1 where the second detector comprises:

an optical detector; and a thin-film variable interferometer layer coupled to the optical detector.

8. The apparatus of claim 7 where the thin-film variable interferometer layer further comprises first and second dielectric thin-film layers each having respective conductive contacts to apply charge to each respective thin-film layer to vary its dielectric constant.

9. The apparatus of claim 1 where the first and second wavelengths are in the infrared portion of the electromagnetic spectrum.

* * * * *